United States Patent
Allmon et al.

(10) Patent No.: US 7,044,426 B1
(45) Date of Patent: May 16, 2006

(54) FITTING FOR BUILDING STRUCTURES AND THE LIKE

(76) Inventors: James A. Allmon, 174 Midland Way, Danville, CA (US) 94526; Larry J. Simon, Jr., 930 N. Harrison Ave., Campbell, CA (US) 95008; Douglas E. Weiland, 4829 Felter Rd., Milpitas, CA (US) 95035; Allen A. Spielberger, 1639 Collingwood Ave., San Jose, CA (US) 95125; John D. Pryor, 4028 39th Ave., Oakland, CA (US) 94619

( * ) Notice: Subject to any disclaimer, the term of this patent is extended or adjusted under 35 U.S.C. 154(b) by 0 days.

(21) Appl. No.: 10/981,586

(22) Filed: Nov. 5, 2004

Related U.S. Application Data

(63) Continuation of application No. 10/206,987, filed on Jul. 30, 2002.

(51) Int. Cl.
*E04B 1/38* (2006.01)
*F16M 7/00* (2006.01)

(52) U.S. Cl. ............ 248/500; 248/499; 52/167.1; 52/155; 52/713; 403/396

(58) Field of Classification Search ........... 248/499, 248/500, 503; 411/419, 383, 924; 403/396, 403/389, 390; 439/778–779, 389, 784; 52/167.1, 52/167.3, 149, 155, 699, 713
See application file for complete search history.

(56) References Cited

U.S. PATENT DOCUMENTS

| | | | |
|---|---|---|---|
| 629,051 A | 7/1899 | Swan | |
| 656,686 A | 8/1900 | Wolf | |
| 1,677,783 A * | 7/1928 | Kearney | 439/780 |
| 2,574,073 A | 11/1951 | Vanderveld | |
| 3,353,312 A | 11/1967 | Storch | |
| 3,552,257 A * | 1/1971 | Tanabe | 411/368 |
| 3,597,893 A | 8/1971 | Spanel | |
| 4,065,218 A | 12/1977 | Biggane | |
| 4,078,752 A | 3/1978 | Kindorf | |
| 4,147,446 A * | 4/1979 | Frank, Jr. | 403/390 |
| 4,445,255 A | 5/1984 | Olejak | |
| 4,524,936 A | 6/1985 | Hurtubise | |
| 4,645,166 A | 2/1987 | Checkley et al. | |
| 4,673,151 A | 6/1987 | Pelz | |
| 4,714,219 A | 12/1987 | Mayse | |
| 4,789,286 A | 12/1988 | Laput | |
| 5,022,104 A | 6/1991 | Miller | |
| 5,129,844 A * | 7/1992 | Goto et al. | 438/778 |
| 5,188,317 A | 2/1993 | Roth, Jr. et al. | |
| 5,330,233 A | 7/1994 | Kress | |
| 5,337,034 A | 8/1994 | Grimes | |
| 5,360,431 A * | 11/1994 | Puno et al. | 606/72 |
| 5,435,661 A | 7/1995 | Zmyslowski et al. | |
| 5,679,030 A * | 10/1997 | Chadbourne et al. | 439/778 |
| 5,699,993 A | 12/1997 | Hill et al. | |
| 5,928,233 A * | 7/1999 | Apfelbaum et al. | 606/61 |

(Continued)

*Primary Examiner*—Winnie Yip
(74) *Attorney, Agent, or Firm*—Shlesinger, Arkwright & Garvey LLP

(57) ABSTRACT

A fitting to prevent movement during seismic activity between a building structure or the like and a rod and channel support or the like connected to said building which may include anti-torque means between the anchor and the channel for preventing rotation of the anchor about the rod. The fitting is directed to a specific slot design to permit ease in access around a rod of a rod and channel support or the like.

7 Claims, 9 Drawing Sheets

U.S. PATENT DOCUMENTS

| | | |
|---|---|---|
| 5,983,573 A | 11/1999 | MacKarvich |
| 6,026,545 A | 2/2000 | Duggan |
| 6,050,035 A | 4/2000 | Thompson et al. |
| 6,059,251 A | 5/2000 | Gutelius, Jr. et al. |
| 6,134,850 A | 10/2000 | Hui et al. |
| 6,134,858 A | 10/2000 | Gutelius, Jr. et al. |
| 6,135,687 A * | 10/2000 | Leek et al. .................. 411/10 |
| 6,176,056 B1 | 1/2001 | MacKarvich |
| 6,220,562 B1 | 4/2001 | Konkle |
| 6,247,274 B1 | 6/2001 | Thompson et al. |
| 6,343,449 B1 | 2/2002 | MacKarvich |
| 6,415,560 B1 | 7/2002 | Rinderer |
| 6,424,315 B1 * | 7/2002 | Glenn et al. ................. 343/895 |
| 6,440,132 B1 * | 8/2002 | Jackson ....................... 606/61 |

* cited by examiner

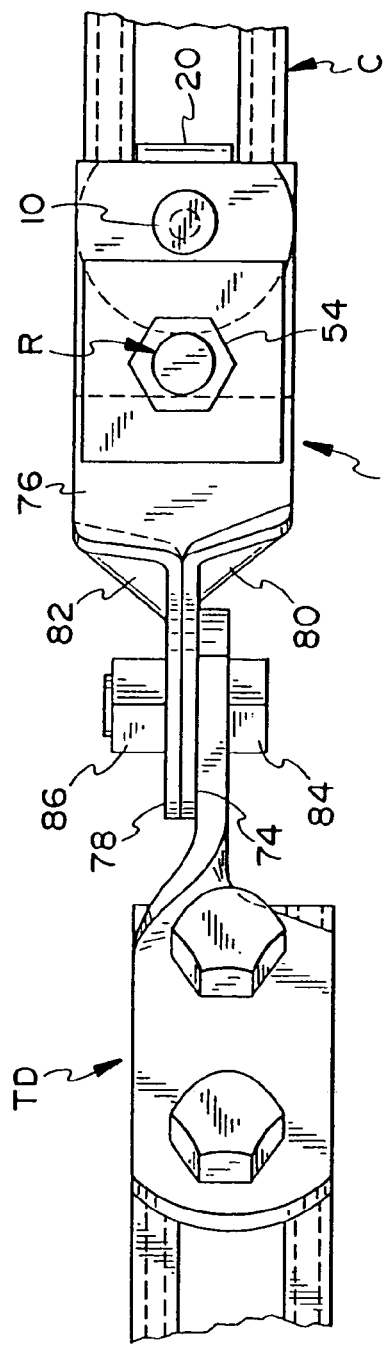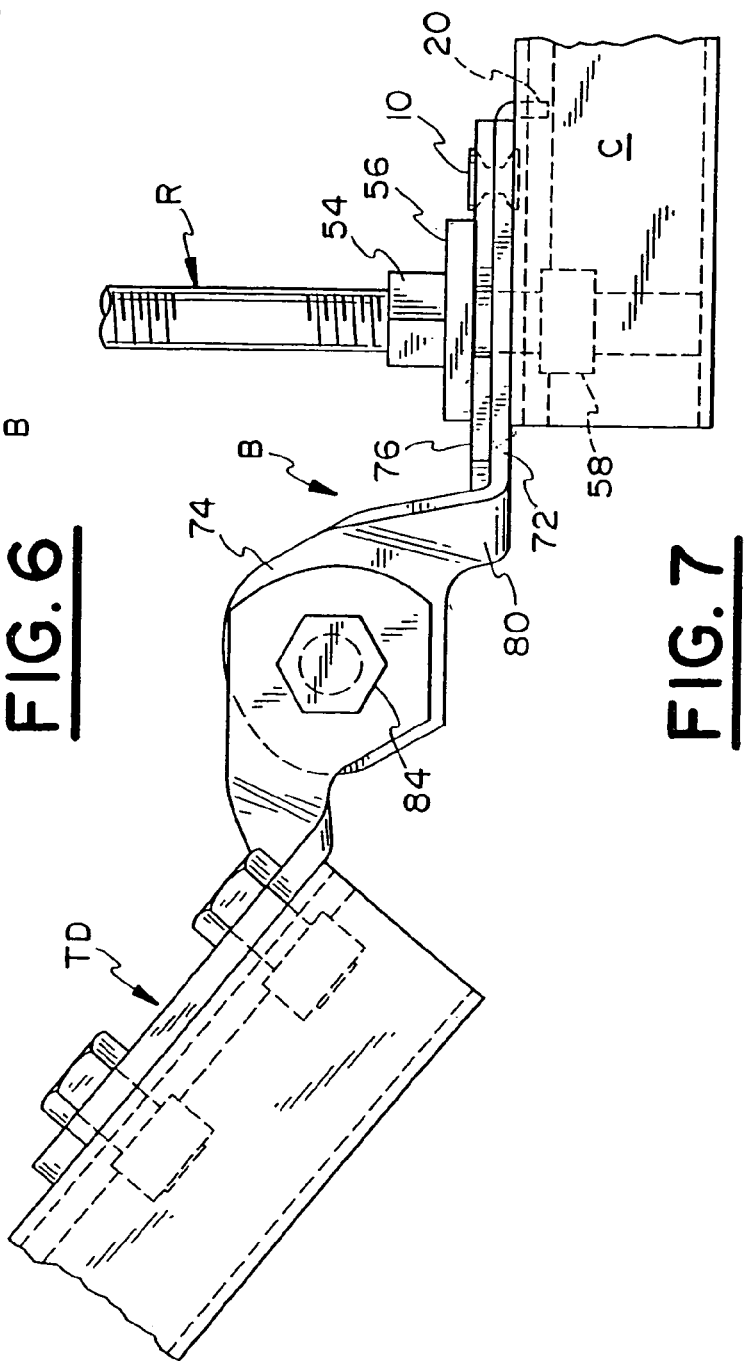

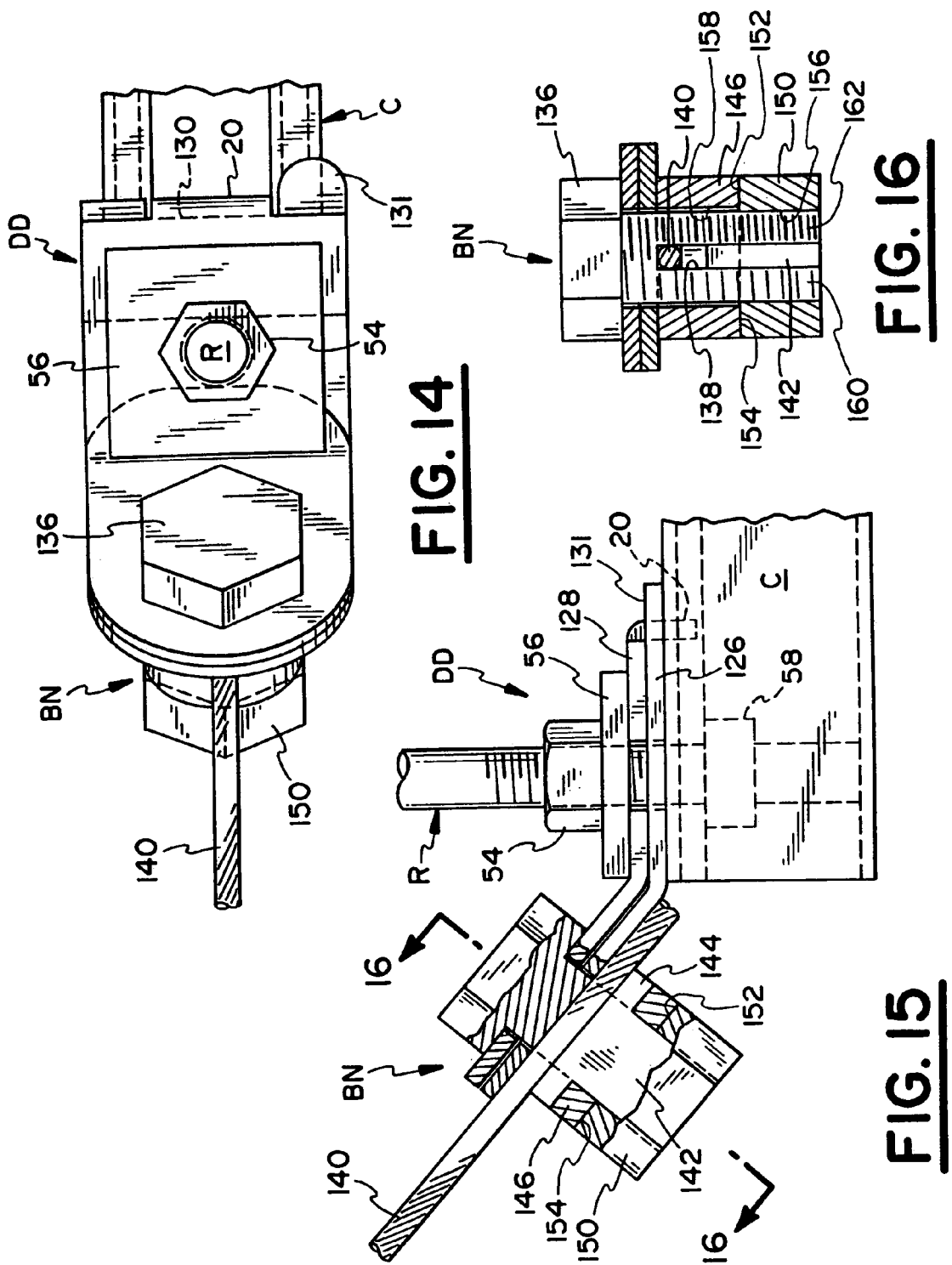

FITTING FOR BUILDING STRUCTURES AND THE LIKE

CROSS-REFERENCE TO RELATED APPLICATION

This application is a continuation application of application Ser. No. 10/206,987, filed Jul. 30, 2002 and is incorporated herein by reference.

FIELD OF INVENTION

This invention is directed towards an anti-torque retrofittable mechanism for preventing rotation about the rod of a rod and channel support by locking the fitting in the channel sometimes referred to as the trapeze. This facilitates the attachment of bracing elements used in seismic and other applications. The invention is also directed toward a specific slot design permitting ease in access around a rod of a rod and channel support and the like.

BACKGROUND OF THE INVENTION

In the early part of a last century, earthquakes caused severe damage to pipes, cables, ducts, and communication lines normally suspended within a building or the like. The suspended units would adversely sway with regard to the movement of the building which would remain intact. Such suspended devices moved independently and would break away from their installed positions creating severe damage requiring replacement in the existing building at great cost.

In order to fix the ducts, pipes, cables and other lines so that they would move in sync with the building when it vibrated under a seismic event, tie downs, hold downs, brackets, clamps, seismic anchors or fittings were developed to keep these elements intact during an earthquake. The fittings were designed primarily to reduce breakaway from the installed positions of the various suspended elements. Similarly, anchors were developed to keep machines and computer equipment from shifting on the floor to which they were positioned. Equipment hold downs are shown in U.S. Pat. No. 6,059,251 to Gutelius et al. and U.S. Pat. No. 5,699,993 to Hill.

The suspended elements supported by seismic bracing are shown in such patents as Biggane U.S. Pat. No. 4,065,218, Roth U.S. Pat. No. 5,118,317, and Thompson U.S. Pat. Nos. 6,050,035 and 6,247,274.

Other patents showing various similar devices include Hurtubise U.S. Pat. No. 4,524,936 and MacKarvich U.S. Pat. No. 6,176,056.

The devices shown in the patents referred to, limit deflection and reduce earthquake related damage, but do not solve the problems in that there tends to be rotation of the anchor mechanism to the channel support whether it be in the ceiling or in the floor which in turn causes unattended shifting of the fittings about an axis causing damage under more sever earthquakes even though the building structure itself may not be severely damaged.

OBJECTS AND SUMMARY

It is an object of this invention to produce a fitting which is connected to a rod and channel structure which will not rotate around the rod or on the channel thereby greatly improving the chances of little damage to suspended or mounted equipment.

A further object of this invention is to provide a seismic fitting which is adaptable for installation in many different types of building conditions including corners or areas which have limited space for maneuverability of the workman or equipment available for installation.

A still further object of this invention is to provide a fitting which will be economically competitive with present devices.

A further object of this invention is to provide a fitting which is strong and durable and economically inexpensive to produce.

Another object of this invention is to provide a fitting which will enable the installer to determine the exact size of the rod which the fitting can encompass since the fittings will be made in various sizes to adapt to different rod diameters in different load bearing structures.

Yet a further object of this invention is to provide a fitting which requires a minimum amount of handling in order to install.

A still further object of this invention is to provide a fitting which can be readily modified to adapt to cable, hook, brackets and the like.

Another object of this invention is to provide a fitting which permits ease in rotating the top and bottom plates relative to each other from open to closed positions.

A further object of this invention is allow installation of the fitting without disassembling existing installations.

Another object of this invention is to provide a seismic fitting which is adaptable for connection to cables and the like.

Still a further object of this invention is to provide a clamp fitting for attaching cable to a seismic anchor system or the like.

Yet another object of this invention is to provide a fitting which can accommodate multiple cable installations in different directions.

A further object of this invention is to provide a fitting which eliminates the potential for missing or dropped subcomponents thus expediting the installation process.

Yet another object of this invention is to provide a fitting for use in anchors which will take loading in tension as well as compression.

Another object of this invention is to provide fittings which may be stacked in at least two directions to allow bracing in more than one direction of a common rod support.

In summary therefore, this invention provides the building trade with a seismic device which is adaptable to all present existing conditions and which will maintain rigidity of the equipment by locking it to the building or structure to which it is attached so that any movement of the building during seismic activity will not cause the suspended elements to shift adversely relative to the building structure. The term "seismic" for the purposes of this disclosure is broadly defined as relating to any arbitrary motion which can be measured, which may occur by stress or strain or movement of an object such as by earthquake, accident, explosion, impact, wind, water or any other such force. The term "anchor" includes hold-downs, tie downs, clamps, fittings, brackets, braces, and the like in that it keeps members from shifting under measurable stress.

The following is a description of the invention in detail in conjunction with the accompanying drawings which are as follows:

DESCRIPTION OF THE DRAWINGS

FIG. 6 is a fragmentary top plan view of a modified version of the invention with portions shown in phantom lines;

FIG. 7 is a side elevational view of the modification shown in FIG. 6 with portions shown in phantom lines;

FIG. 14 is a fragmentary top plan view of a modification of the invention with portions shown in phantom lines;

FIG. 15 is a fragmentary side elevational view of the invention shown in FIG. 14 with portions shown in cross-section and in phantom lines;

FIG. 16 is a cross-section of the cable gripping bolt and nut illustrated in FIG. 15;

DETAILED DESCRIPTION OF THE INVENTION

FIGS. 1–4

Figure 1:
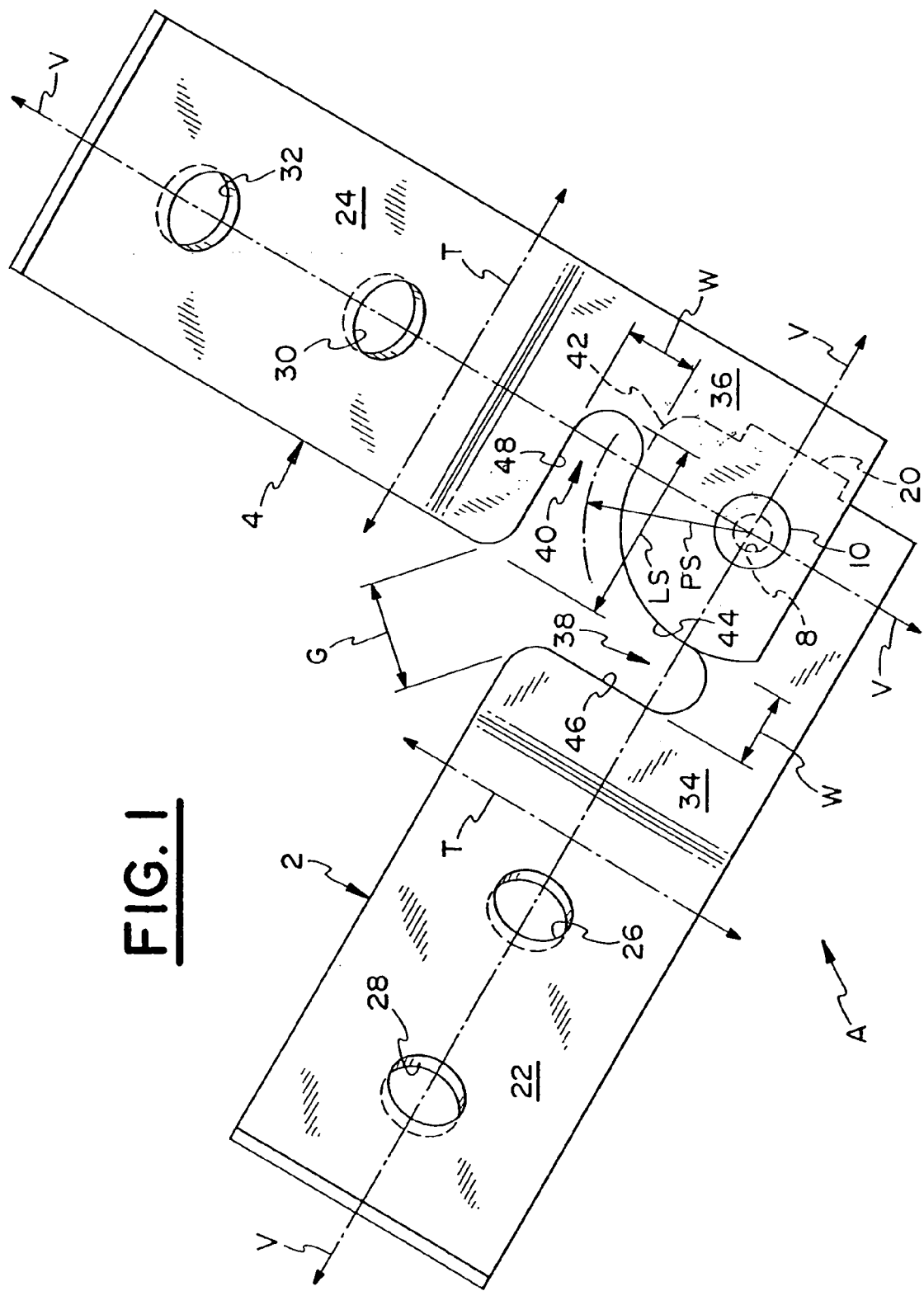
FIG. 1 is a top plan view of the invention with portions shown in phantom lines.
Figure 2:
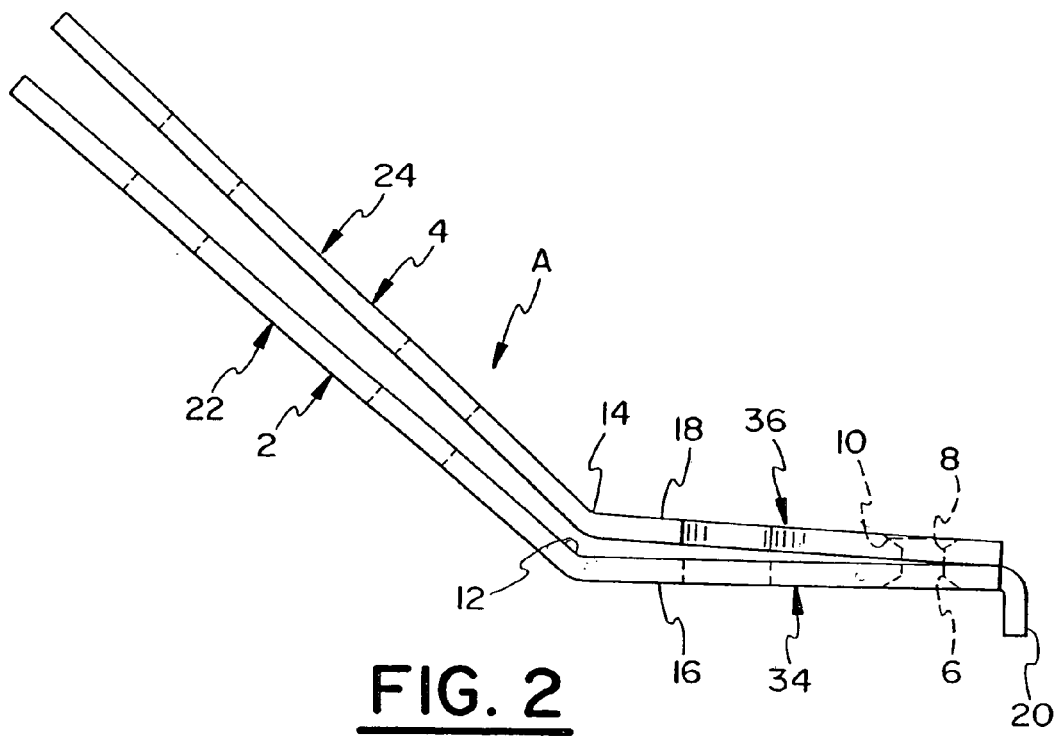
FIG. 2 is a side elevational view of the invention with portions shown in phantom lines.
Figure 5:
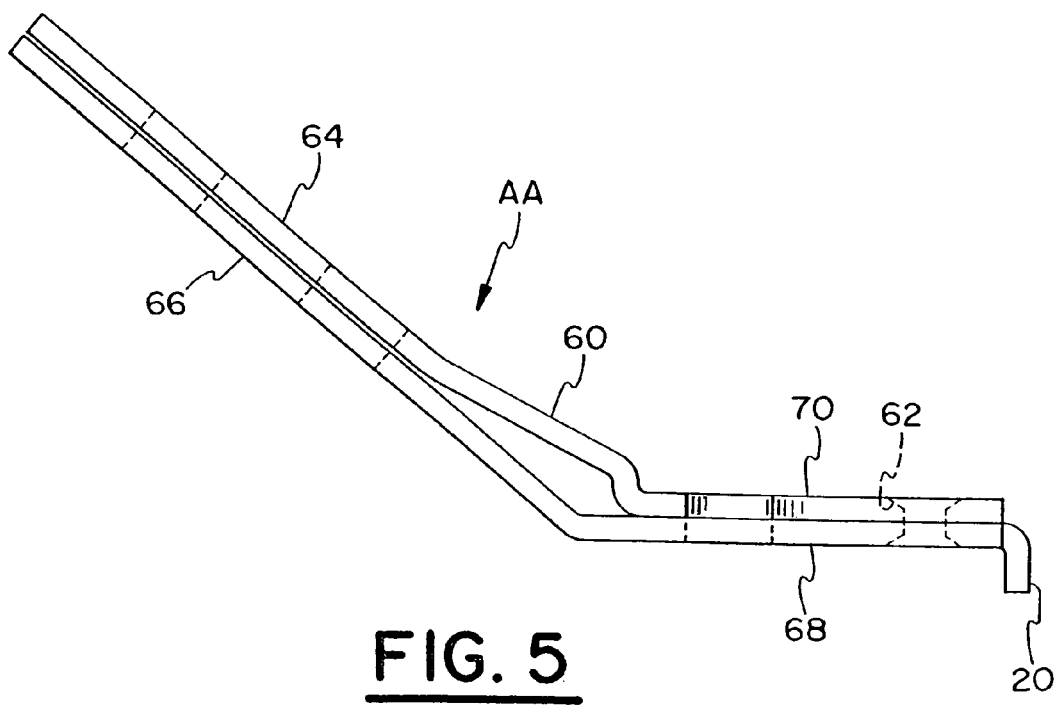
FIG. 5 is a side elevational view of a modification of the invention showing means for permitting the upper and bottom plates to swing without interference.

As illustrated in FIGS. 1–4, the fitting A comprises a bottom plate 2 and a top plate 4. The plates 2 and 4 are constructed of high strength materials including steel, titanium or special synthetics or composites or ceramics. Plates 2 and 4 have openings 6 and 8 for receiving a rivet 10. As illustrated in FIG. 2, the rivet 10 is loosely held in the openings 6 and 8 to permit plates 2 and 4 to swing freely without interference at the angle 12 of plate 2 and 14 of plate 4. If the rivet were not loose, the plates 2 and 4 would not swing freely because the bend at the angles 12 and 14 will interfere with each other. The rivet 10 is raised slightly above the bottom surface 16 of plate 2 and the top surface 18 of the plate 4. In general, the rivet 10 is made substantially flush with the surfaces 16 and 18 in order to avoid interference with other equipment which may be installed nearby.

Plate 2 incorporates a down turned flange or lug 20 at the rear of plate 2. Forward angle portions 22 and 24 of plates 2 and 4 are provided with holes 26, 28, 30 and 32. The rear portions 34 of plate 2 and 36 of plate 4 include slot 38 with bottom 39 and slot 40 with bottom 41. The plates 2 and 4 have a longitudinal axis V and a transverse axis T. The rivet 10, which may be a bolt and nut assembly or the like, lies on the longitudinal axis V of plate 2 along with bolt holes 26 and 28 and on the longitudinal axis V of plate 4 along with the bolt holes 30 and 32. FIG. 2 illustrates the gap distance between plates 2 and 4 permitting swing of the two plates together about the pivot 10 and its center axis.

When the plates are at right angles to each other as illustrated in FIG. 1, the gap distance G substantially equals the width W of the slots 38 and 40. The length of the slots LS is substantially equal to the length PS being the distance from the center axis of the pivot 10 to the center of the slot 38 or 40 as illustrated in FIG. 1. It is to be noted that slots 38 and 40 have there inner sides 42 and 44 arcuate about the center axis of the pivot 10. The outer sides 46 of plate 2 and 48 of plate 4 are substantially straight and transverse to the longitudinal axis L.

Figures 3, 4:
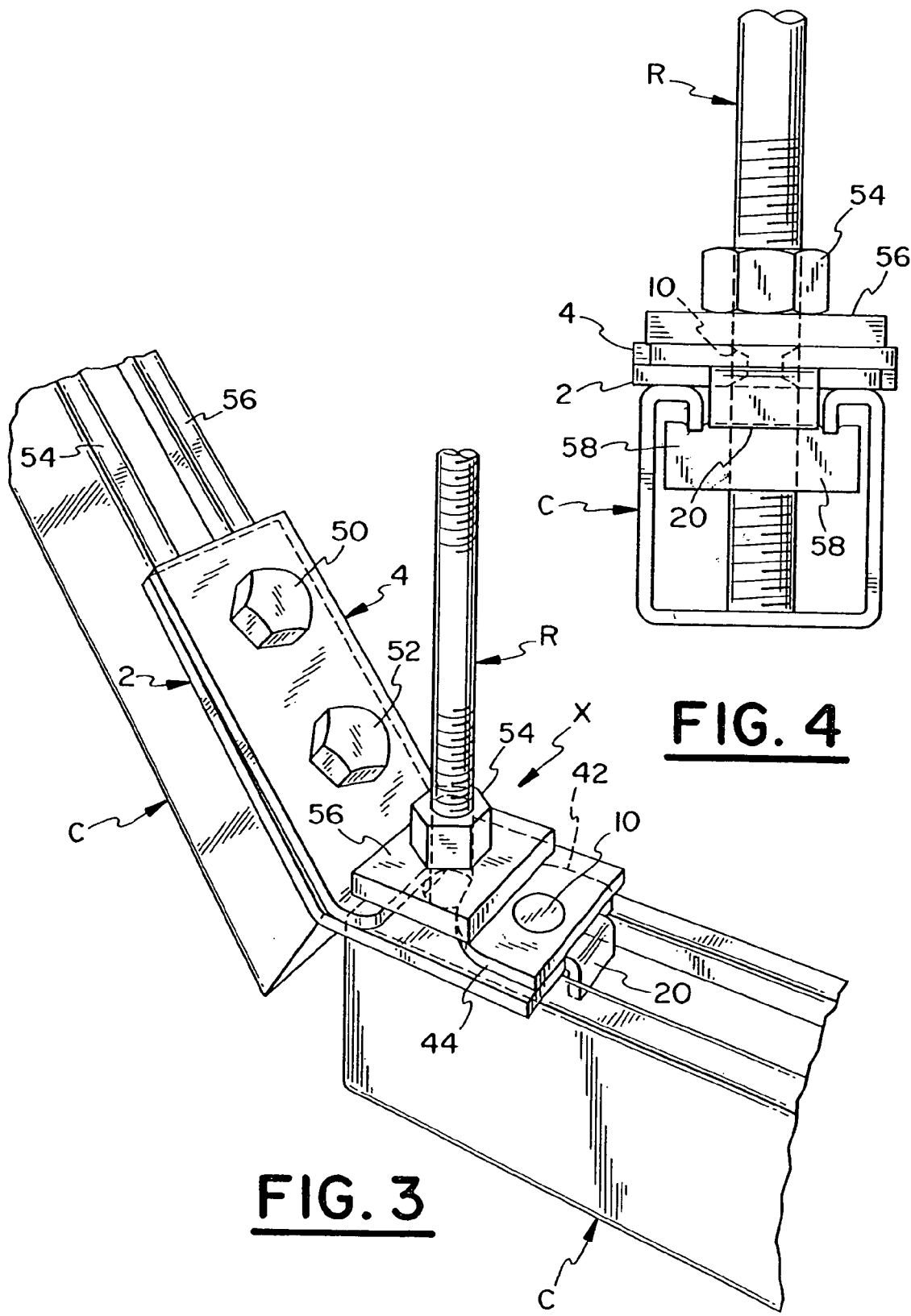
FIG. 3 is a fragmentary perspective of the invention shown in FIG. 1 when assembled in a rod and channel structure.
FIG. 4 is a fragmentary end elevational view of the assembly generally illustrated in FIG. 3 with portions shown in phantom lines.

When the plates form a right angle (90°) to each other, the gap distance G serves as a gauge for the rod R of the assembly X generally shown in FIG. 3. The rod width R may vary depending upon the load carried which also changes the width of slots 38 and 40. The arcuate sides 42 and 44 of the slots, provide the installer with ease of manipulation of the devices in difficult areas.

Referring now to FIG. 3, channel members C are interconnected by plates 2 and 4. Bolts 50 and 52 engage keepers (not shown) which engage the underside of flanges 54 and 56 of the channel C. It is to be noted in FIG. 3 that the flange 20 enters the channel C and provides anti-torque of the plates 2 and 4 about the rod R. In FIG. 3, the rod R has a nut 54 engaging a square washer 56 on top of the plate 4. FIG. 4 shows the rod R engaging a lock nut 58 for positioning the rod R in the channel C.

It is obvious that plates 2 and 4 may under certain circumstances be flat rather than angled plates 2 and 4 are connected to a tie-down (not shown).

In FIG. 3, it is to be noted that the arcuate end of the edge 42 lies inside the side edge of plate 4 and the arcuate side 44 of plate 4 lies inside of the edge of plate 2. This arrangement prevents interference of the edges with the rod when opening or closing the seismic anchor A about the rod R.

FIG. 5

Instead of the fitting A as illustrated in FIG. 2, the fitting AA has a step 60. A rivet 62 secures the upper plate 64 to lower plate 66. The step 60 permits plates 64 and 66 to swing relative to each other without interference. This permits the rivet 62 to be flush with the bottom surface 68 of plate 66 and flush with the top surface 70 of the top plate 64.

FIGS. 6–7

In FIGS. 6 and 7 of fitting B, the bottom plate 72 includes an ear 74. The top plate 76 also includes an ear 78 which is a mirror image of the ear 74. The two plates 72 and 76 swing about the pivot 10 in the manner previously discussed relative to the plates illustrated in FIGS. 1–4. The plates 72 and 76 have angled upward sweeping portions 80 and 82 which connect to the ears 74 and 78 respectively. The ears 74 and 78 include a bolt hole (not shown) which receives a bolt 84 secured by a nut 86. The bolt 84 and nut 86 secures additional tie down TD apparatus as understood from a review of the prior art patents referred to earlier.

FIGS. 8, 9, 10 and 11

Figure 8:
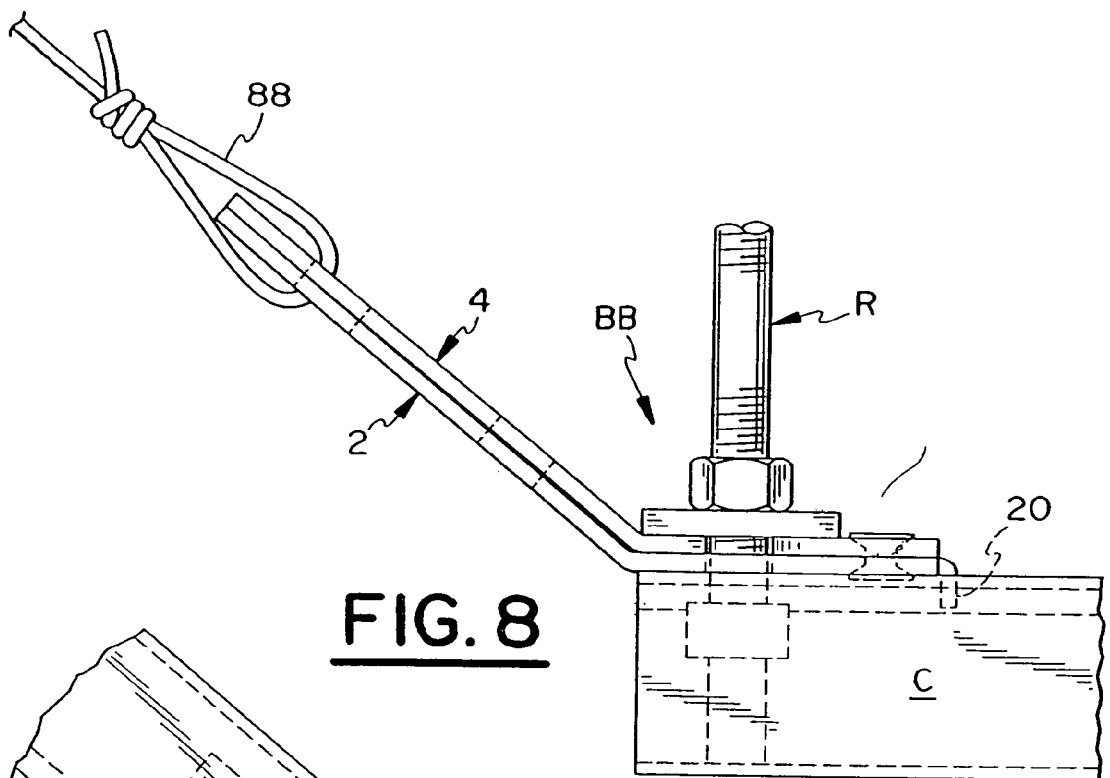
FIGS. 8, 9, 10, and 11 are fragmentary side elevational views of various modifications of the invention with portions shown in phantom lines.

FIG. 8 shows a fitting BB connected to a cable 88.

Figure 9:
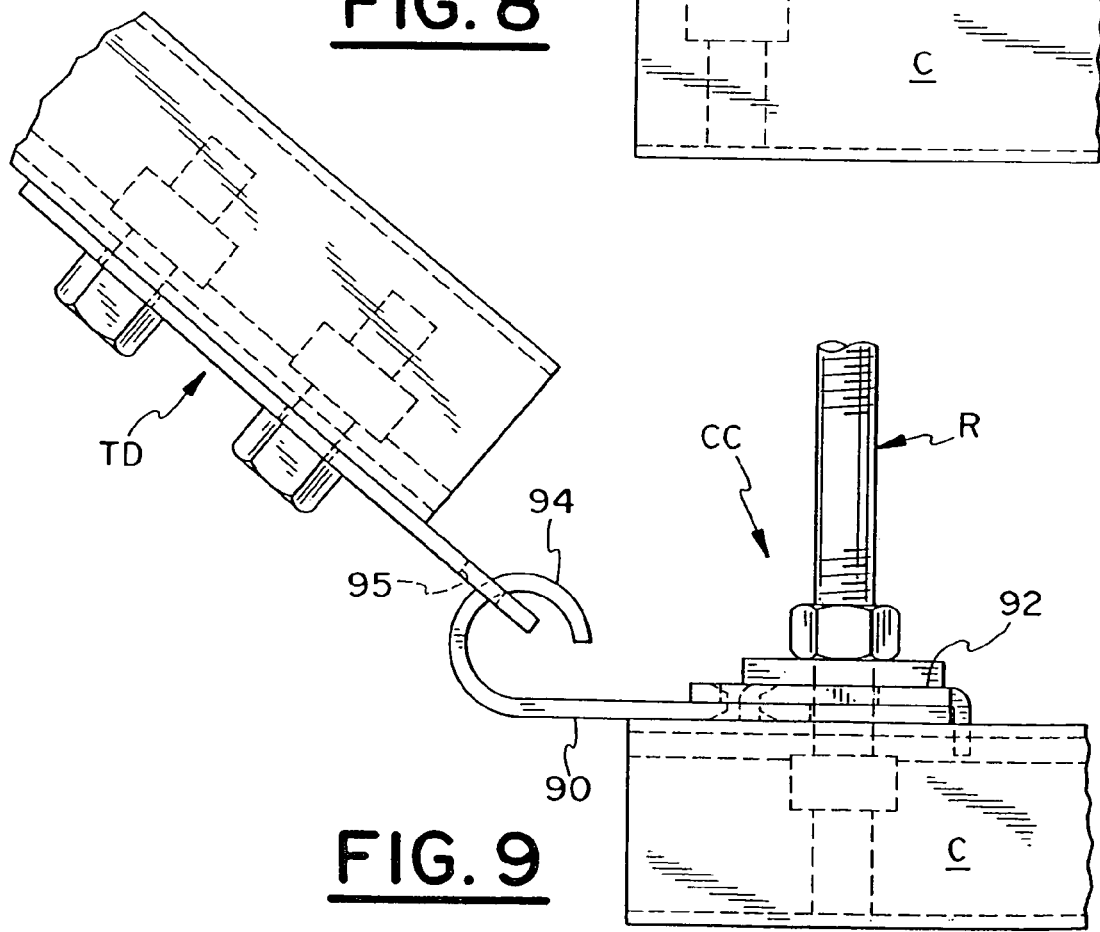

FIG. 9 shows a fitting CC with plates 90 and 92. Plate 90 includes a hook or the like 94 which engages an opening 95 in the tie down TD.

Figure 10:
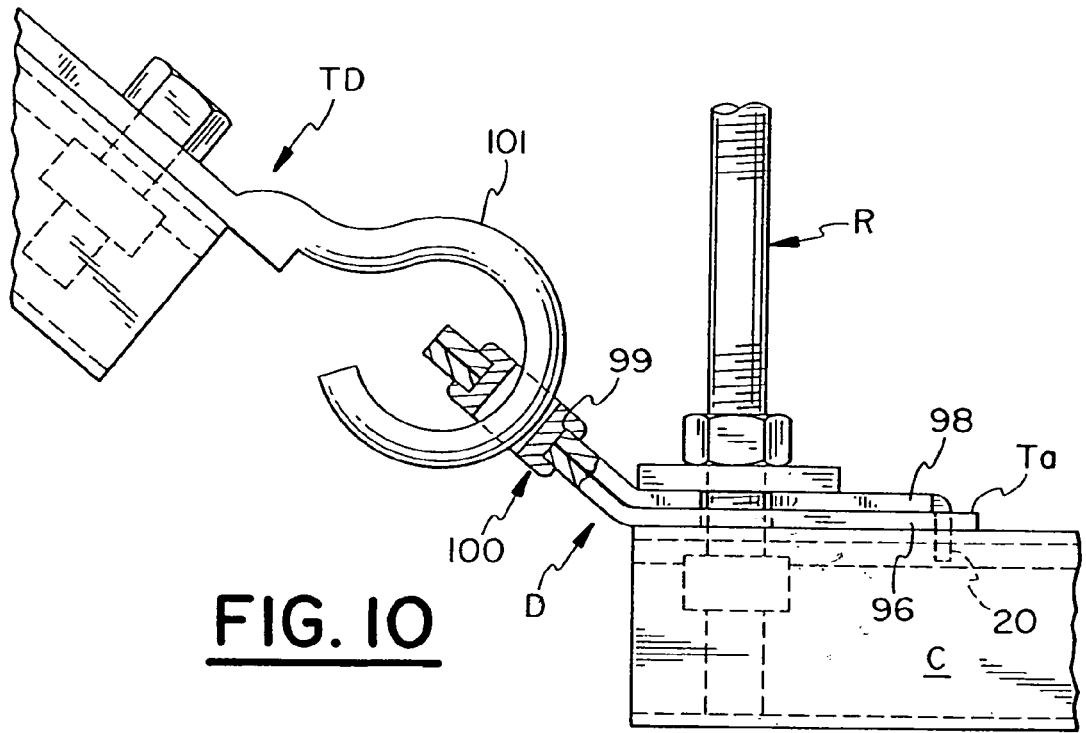

FIG. 10 fitting D is provided with plates 96 and 98 having an opening 99 which has received a resilient material grommet 100 for receiving the hook 101 of the tie down TD. Plate 96 has a tab Ta to facilitate opening (see FIG. 14).

Figure 11:
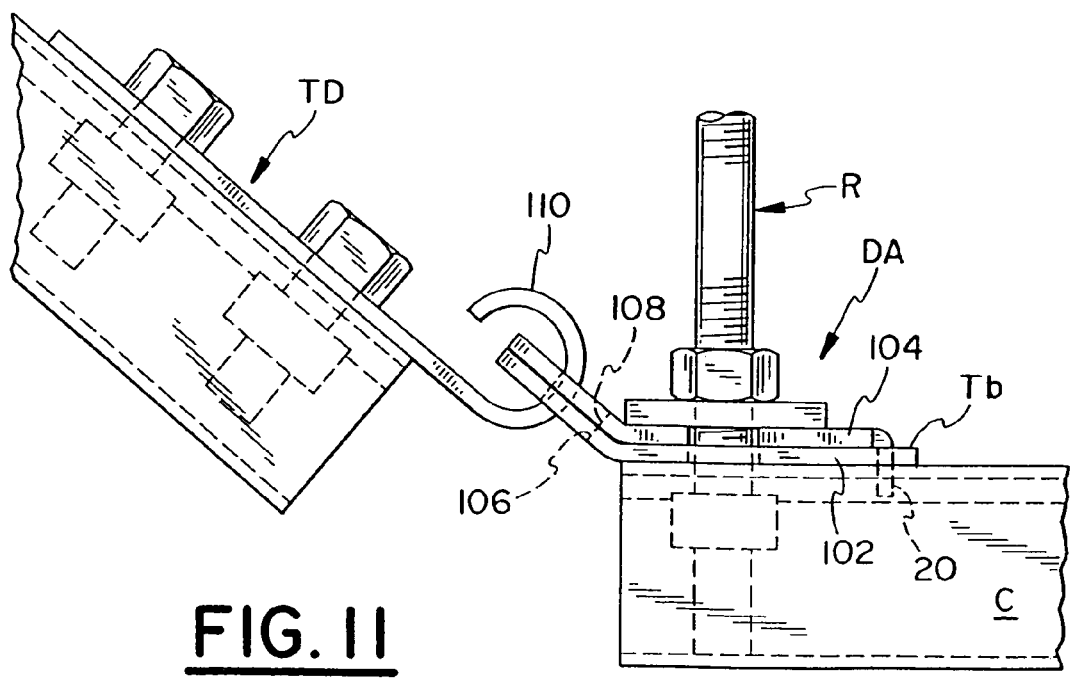

FIG. 11 shows the fitting DA having plates 102 and 104 provided with slots 106 and 108 for receiving a hook 110 of the tie down TD. Plate 102 also has a tab Tb to facilitate opening (see FIG. 14).

Figure 12:
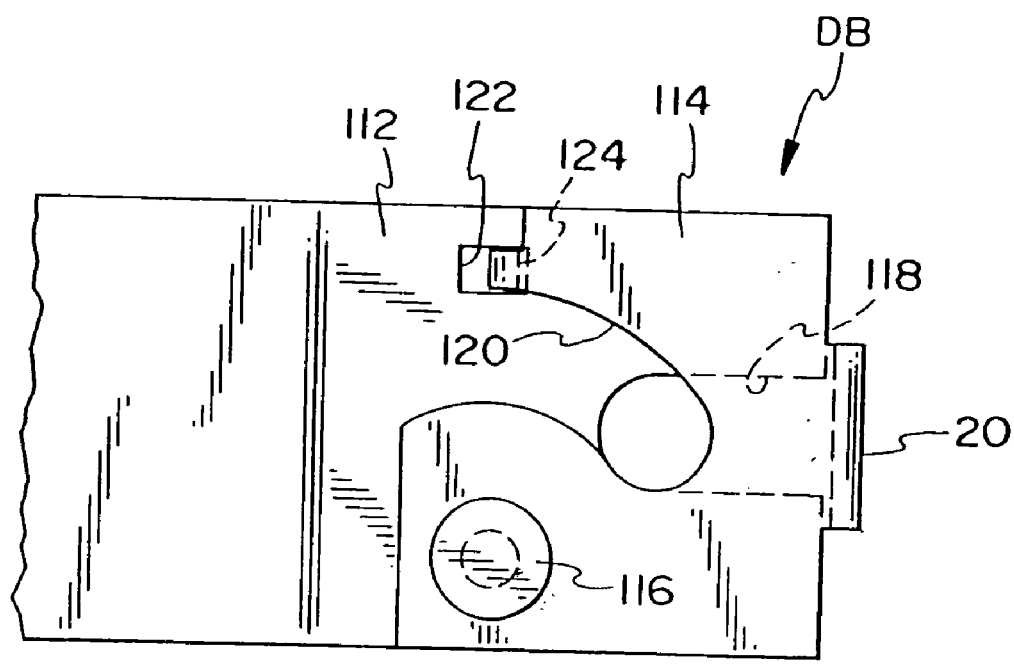
FIG. 12 is a fragmentary top plan view of a modified version of the invention with portions shown in phantom lines.
Figure 13:
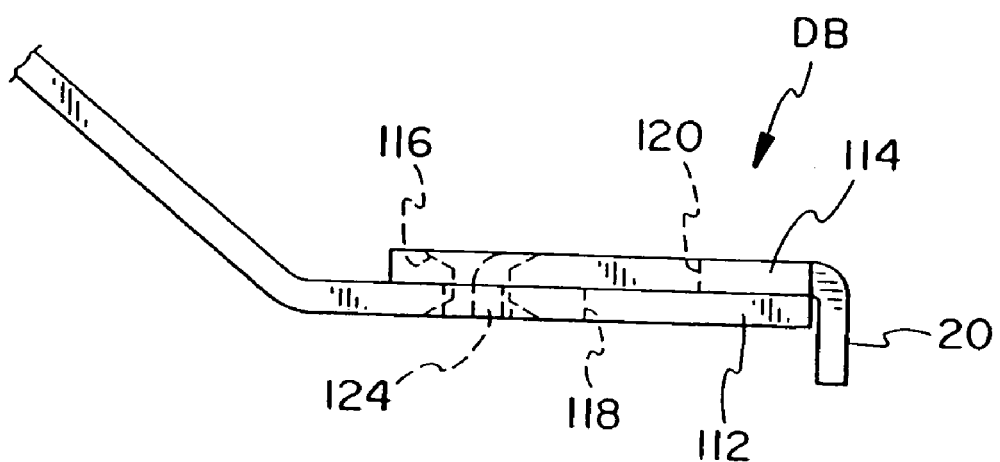
FIG. 13 is a fragmentary side elevational view of the modified version shown in FIG. 12 with portions shown in phantom lines.

FIGS. 12 and 13

FIGS. 12 and 13 show a fitting DB provided with plates 112 and 114 connected by a pivot 116. Bottom plate 112 has a straight slot entering from the rear side, and top plate 114 has a curved slot 120 entering from the front side of plate 114. Lug or flange 20 is connected to top plate 114. Bottom plate 112 includes an opening 122 for receiving a lock finger 124 on the top plate 114. Plates 112 and 114 are loosely connected by pivot 116 and are locked down by the nut 54 and washer 56 on the rod R.

FIGS. 14–17

In FIGS. 14 through 17, the fitting DD is designed to receive a cable clamping bolt and nut device BN which provides a uniformly distributed load along an engaged cable. The fitting device BD of this modification includes plates 126 and 128. The flange 20 which engages the slot of the channel C extends downward from the top plate 128 through a recess 130 of the bottom plate 126. Plate 126 has a tab 131 to facilitate the opening of the fitting DD. Plates 126 and 128 are provided with cooperating holes 132 and 134 for receiving the bolt and nut BN.

Figure 17:
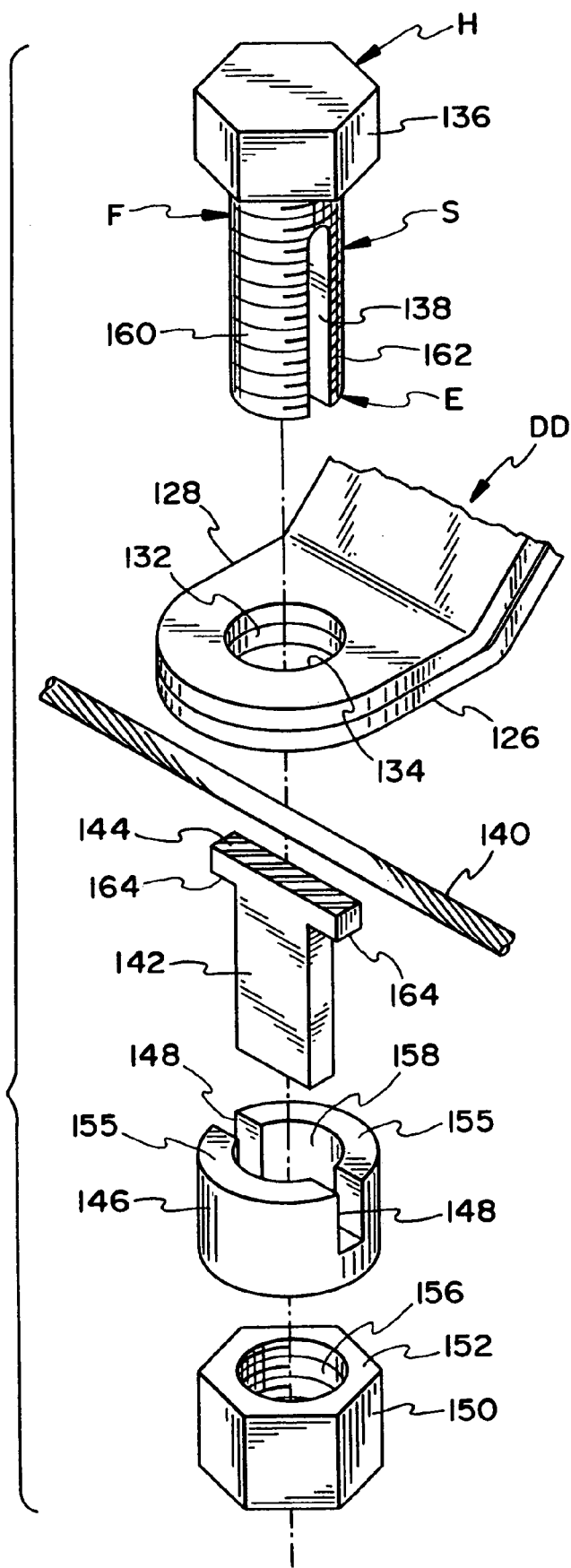
FIG. 17 is a fragmentary exploded view of the nut assembly illustrated in FIGS. 14, 15 and 16.

As best shown in FIG. 17, the bolt and nut device BN comprises a bolt 136 having a slot 138 into which a cable 140 or the like is received. Bolts 136 has a head H and a threaded shank S. The shank S has a base F mounted to the head H and the end E is threaded. Plates 126 and 128 may be lengthened and provided with additional holes 132 and 134 for receiving additional BN devices for mounting additional cables 140 in various directions. A T-shaped cable clamp 142, having gripping serrations 144, engages the cable 140. A washer 146 having a slot 148, engages the cable clamp 142 when positioned about the bolt 136. Washer 146 may be a load indicating washer which by color change or other means can advise the installer when the correct load has been applied to the bolt and nut device BN on the cable 140. The washer 146 and clamp 142 may be of one piece construction. The nut 150 is threaded onto the bolt 138. When the washer 146 and the cable clamp 142 are positioned on the bolt 136, the nut 150 is tightened down on the bolt and clamps the cable clamp 142 against the cable 140 with gripping means 144 including serrations, knurling, coining, ribbing or arcuate configuring engaging the cable to resist stripping of the cable 140 from the bolt and nut device BN. For resistance against slipping of the cable 140 when it is clamped down by the bolt and nut device BN, the bottom of the slot 138 of the bolt 136 could also be provided with gripping means in the same manner as clamp 142. FIGS. 14 to 17 show the bolt and nut device BN with the bolt 136 downwardly positioned. Obviously the reverse can be made with the bolt 136 in the up position of the bolt and nut assembly BN. Nut 150 has a bottom portion 152 which engages the top portion 154 of the washer or sleeve 146. When sleeve 146 is placed on shank S, the top portion 154 of the washer or sleeve 146 completely encircles the shank 5 including the slot 138 of shank S. The sleeve 146 has bottom surfaces 155 which engages the plate 126 of the anchor fitting DD. The inside nut wall 156 and the inside sleeve wall 158 with the exception of slots 148 vertically surround and cover the legs 160 and 162 of the shank S. The projecting ends of cross bar 164 of the T-shaped cable clamp 142 engage the bottom of slots 148. When the cable 140 is positioned in slot 138 and slots 148 and nut 150 is threaded down on shank S, the entire cable diameter lies in the slots 138 and 148 and the bottom surfaces 155 engage the plate 126 while the cable 140 engages the T-shaped cable clamp 142 and the bottom of the slot 138. The base F of the shank S extends through the plate 126.

In all instances of this development, the seismic devices A, AA, B, BB, CC, D, DA, DB and DD, are provided with the anti-torque flange 20 adapted to be positioned in the channel C. All of the devices aforementioned are provided with slots for clamping around the rod R. In the configurations of FIGS. 14–17, the bolt and nut device BN, when installed in plates 126 and 128, permits rotation of the plates 126 and 128 relative to each other for manipulating around the rod R. When DD is used in FIG. 10 the resilient grommet permits rotation of the plates 126 and 128 relative to each other for manipulation around the rod R.

The fittings A, AA, B, BB, CC, D, DA, DB, and DD may, in some instances, be made without the flange 20 for special applications where torque is unnecessary because of other mechanisms on structure surrounding the fittings A, AA, B, BB, CC, D, DA, DB and DD.

While this invention has been described as having a preferred design, it is understood that it is capable of further modifications, and uses and/or adaptations of the invention, following in general the principle of the invention and including such departures from the present disclosure as come within the known or customary practice in the art to which the invention pertains, and as may be applied to the central features herein before set forth, and which come within the scope of the invention or limits of the claims appended hereto.

What is claimed is:

1. A bolt and nut cable clamp assembly for clamping a cable to a anchor fitting comprising:
    a) a bolt having a head and a threaded shank;
    b) said threaded shank having a base mounted to said head and a threaded end extending from said base for mounting the anchor fitting thereon;
    c) said threaded end having a longitudinal slot having an end, and said slot extending from said threaded end to said base;
    d) said shank having a pair of opposed equal length threaded legs separated by said longitudinal slot and said threaded legs having first and second portions;
    e) a slideably mounted sleeve washer on said shank and having top and bottom portions;
    f) said sleeve washer having a pair of spaced aligned equal length slots on said sleeve washer bottom portion and each having a bottom;
    g) a nut having a threaded inside wall engageable with said threaded end of said shank, and said sleeve washer having an inside wall;
    h) said sleeve washer inside wall and said nut threaded inside wall completely encircling and receiving said shank including a portion of said shank longitudinal slot and said first portion of said shank legs;

i) a cable clamp mounted in said nut and sleeve washer having a top and bottom;

j) said cable clamp having opposed projecting ends one of which is insertable and engageable in the bottom of one of said sleeve washer equal length slots and the other of which is insertable and engageable in the bottom of the other said sleeve washer equal length slots;

k) said sleeve washer equal length slots being of a length sufficient to receive said cable clamp projecting ends and the entire width of the cable position therein;

l) said bottom portion of said sleeve washer engageble with said anchor fitting when said cable is mounted in both said shank slot and said sleeve washer slot;

m) said bottom portion of said sleeve washer inside wall covering said second portion of said shank legs;

n) said bottom of said cable clamp engageable with said cable and the anchor fitting when said nut is tightened down along said threaded end of said bolt and against said top portion of said sleeve washer and applying pressure to said cable clamp projecting ends forcing said cable against said end of said shank longitudinal slot thereby preventing slipping of said cable from said anchor fitting.

2. A nut and bolt clamp assembly as in claim 1, and wherein:

a) said cable clamp is T-shaped.

3. A nut and bolt clamp assembly as in claim 2, and wherein:

a) said T-shaped cable clamp has a T-cross bar and a T-leg; and b) said T-cross bar includes a gripper surface.

4. A nut and bolt clamp assembly as in claim 1, wherein:

a) said cable clamp has a serrated gripping surface.

5. A nut and bolt clamp assembly as in claim 1, and wherein:

a) said washer includes a load indicator.

6. A nut and bolt clamp assembly as in claim 5, and wherein:

a) said load indicator is a color shape indicator.

7. A nut and bolt cable clamp assembly as in claim 1, and wherein:

a) said nut and bolt cable clamp assembly includes at least one cable gripping surface.

* * * * *